United States Patent
Bailey et al.

(10) Patent No.: US 10,915,377 B2
(45) Date of Patent: Feb. 9, 2021

(54) AUTOMATICALLY BUILDING A WEB API DEFINITION FROM A MICROSERVICE OR WEB APPLICATION

(71) Applicant: International Business Machines Corporation, Armonk, NY (US)

(72) Inventors: Christopher N. Bailey, Southampton (GB); Michael J. Tunnicliffe, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/983,514

(22) Filed: May 18, 2018

(65) Prior Publication Data
US 2019/0354414 A1    Nov. 21, 2019

(51) Int. Cl.
*G06F 9/54*    (2006.01)
(52) U.S. Cl.
CPC ...................................... *G06F 9/54* (2013.01)
(58) Field of Classification Search
None
See application file for complete search history.

(56) References Cited

U.S. PATENT DOCUMENTS

| | | | |
|---|---|---|---|
| 7,788,640 B2 | 8/2010 | Grimaldi | |
| 8,819,629 B2 | 8/2014 | Sherrill | |
| 9,258,238 B2* | 2/2016 | Bahadur | ............... H04L 47/125 |
| 2003/0037312 A1 | 2/2003 | Czech | |
| 2007/0255719 A1* | 11/2007 | Baikov | .................... G06F 16/95 |
| 2011/0265066 A1* | 10/2011 | Fee | ......................... G06F 9/5027 717/139 |
| 2012/0159438 A1* | 6/2012 | Plate | ................... G06F 9/44505 717/121 |
| 2013/0055291 A1* | 2/2013 | Pierson | ................. G06F 9/4484 719/328 |
| 2013/0091491 A1 | 4/2013 | Koutyrine et al. | |
| 2013/0205279 A1* | 8/2013 | Osminer | ................... G06F 8/73 717/123 |
| 2014/0040863 A1 | 2/2014 | Hale et al. | |
| 2015/0128103 A1* | 5/2015 | Stratton | .................... G06F 8/00 717/100 |
| 2016/0019102 A1* | 1/2016 | Cui | ......................... G06F 9/542 719/328 |
| 2016/0026461 A1 | 1/2016 | Bannister et al. | |
| 2017/0331812 A1* | 11/2017 | Lander | ................ H04L 63/0815 |

(Continued)

OTHER PUBLICATIONS

Wikipedia, "Application programming interface", en.wikipedia.org/wiki/Application_programming_interface, retrieved on May 9, 2018, 8 pages.

(Continued)

*Primary Examiner* — Chat C Do
*Assistant Examiner* — William C Wood
(74) *Attorney, Agent, or Firm* — Nolan M. Lawrence

(57) ABSTRACT

Methods and systems may provide for technology to determine dynamic path information and encoded type information associated with an application programming interface (API) and automatically generate a language-independent API definition based on the dynamic path information. In one example, the language-independent API definition is generated without reliance on source code annotations.

18 Claims, 3 Drawing Sheets

(56) References Cited

U.S. PATENT DOCUMENTS

2018/0089005 A1* 3/2018 Green .................... G06F 9/547

OTHER PUBLICATIONS

Wikipedia, "Closure (computer programming)", en.wikipedia.org/wiki/Closure_(computer_programming), retrieved on May 7, 2018, 15 pages.
De La Torre, C., "Generating swagger description metadata from your ASP.NET core web APIs with Swashbuckle", Dec. 5, 2016, 4 pages.
"Java platform, standard edition: Javadoc guide", Sep. 2017, 43 pages.
Vasudevan, K., "Microservices, APIs, and swagger: How they fit together", Apr. 18, 2017, 6 pages.
Wikipedia, "Web API", en.wikipedia.org/wiki/Web_API, retrieved on May 9, 2018, 4 pages.
Bailey et al., "Dynamically Switchable Transmission Data Formats in a Computer System," U.S. Appl. 16/140,807, filed Sep. 25, 2018.
Tunnicliffe et al., "Handling Request Data with Type Safety in a Remote Service," U.S. Appl. No. 16/048,258, filed Jul. 28, 2018.

* cited by examiner

AUTOMATICALLY BUILDING A WEB API DEFINITION FROM A MICROSERVICE OR WEB APPLICATION

BACKGROUND

Embodiments generally relate to application programming interface (API) definitions. More particularly, embodiments relate to automatically building web API definitions from microservices or web applications.

An API may generally be a set of defined methods of communication between various software components, where an API definition may specify the routines/functions, data structures, object classes, variables/parameters, remote calls, parameter types and response types that facilitate usage and reimplementation of the API. A web API may be used for communication with a web application or a microservice architecture (e.g., application structured as a collection of loosely coupled services). While tools (e.g., Swagger/OpenAPI) may be available to auto-generate definitions for web APIs, there remains considerable room for improvement.

For example, Swagger Core may parse the source code of JAVA applications at build time to create a web API definition. In such a solution, however, a human programmer may be required to add a number of manual annotations to the API source code to create the definition of the route (path) for the API along with the types of parameters and responses used in the communication. Manually annotating the source code may be time consuming and may result in the annotations and source code becoming out of sync (e.g., inconsistent with one another) during operation. Moreover, such a solution may fail to account for situations in which route definitions are determined dynamically (e.g., by loading the route definitions from a file at startup). Accordingly, conventionally generated web API definitions may be costly to create, suboptimal from a performance standpoint and/or incomplete.

BRIEF SUMMARY

Embodiments may include a performance-enhanced computing device comprising one or more user interface devices to output a language-independent application programming interface (API) definition associated with an API, one or more processors to execute the API, and a computer readable storage medium having program instructions embodied therewith, the program instructions executable by the one or more processors to cause the device to determine dynamic path information associated with the API, determine encoded type information associated with the API, and automatically generate the language-independent API definition based on the dynamic path information and the encoded type information.

Embodiments may also include a computer program product to generate application programming interface (API) definitions, the computer program product comprising a computer readable storage medium having program instructions embodied therewith, the program instructions executable by a computing device to cause the computing device to determine dynamic path information associated with an API, determine encoded type information associated with the API, and automatically generate a language-independent API definition based on the dynamic path information and the encoded type information.

Embodiments may also include a method comprising determining dynamic path information associated with an API, determining encoded type information associated with the API, and automatically generating a language-independent application programming interface (API) definition based on the dynamic path information and the encoded type information.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
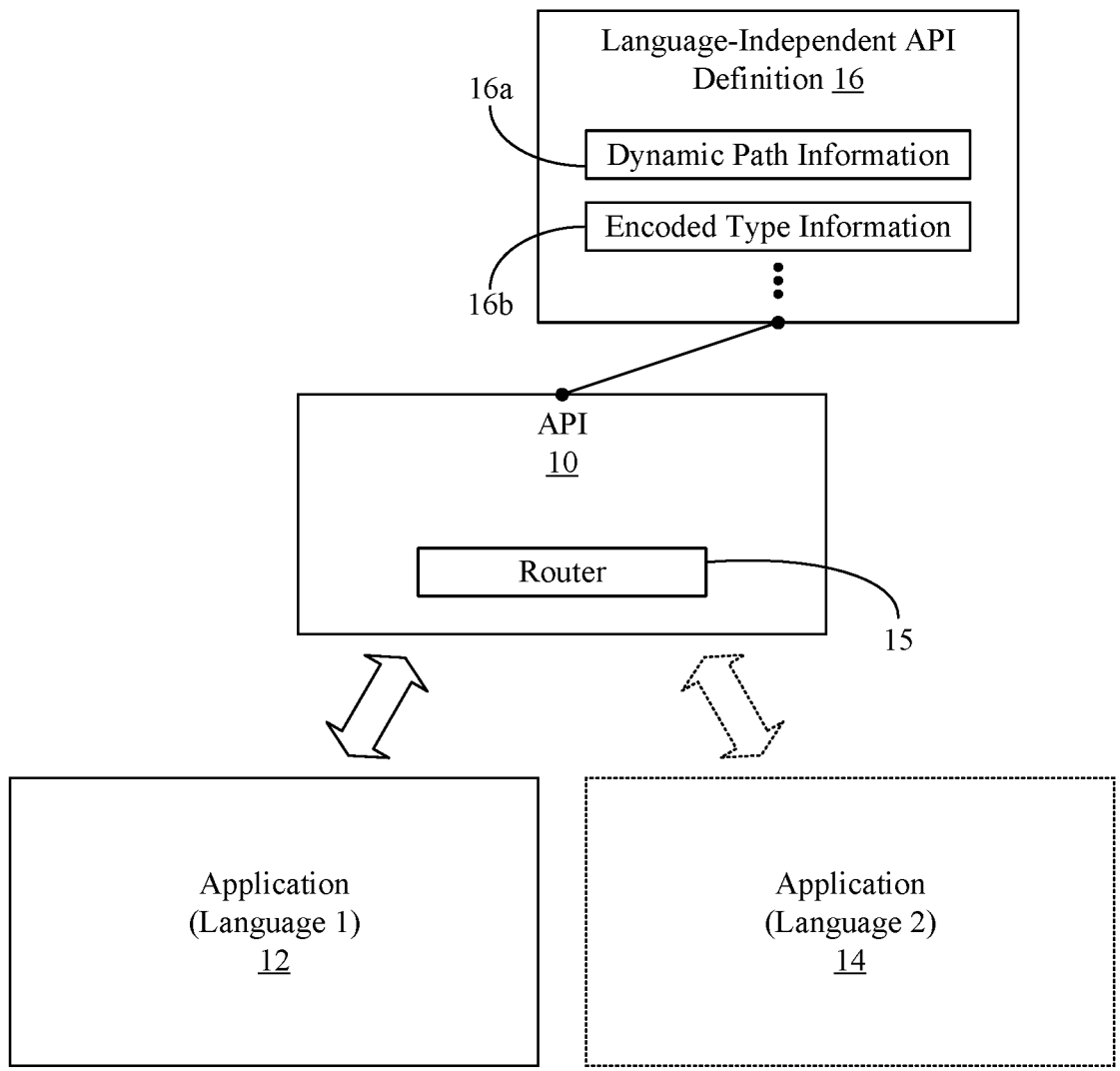
FIG. 1 is a block diagram of an example of a language-independent API definition according to an embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, an application programming interface (API) 10 (e.g., web API) is shown in which the API 10 may communicate with a first application 12 and/or a second application 14. The applications 12, 14 may be microservices (e.g., a collection of loosely coupled services), web browsers, and so forth. In the illustrated example, the first application 12 is written in a different language ("Language 1", e.g., Ruby) than the language ("Language 2", e.g., Node.js) of the second application 14. Thus, the languages might be different versions of the same language (e.g., Hypertext Markup Language/HTML) or different languages altogether.

As will be discussed in greater detail, a language-independent API specification/definition 16 (16a, 16b) may be automatically generated for API 10. For example, the illustrated API definition 16 includes dynamic path information 16a such as, for example, one or more route paths that are registered by the API 10 at runtime. Of particular note is that the dynamic path information 16a may be automatically determined and incorporated into the API definition 16 without reliance on source code annotations associated with the API 10. Accordingly, the illustrated API definition 16 is relatively inexpensive to create and less susceptible to synchronization error (e.g., the source code may be considered a "single source of truth," resulting in no annotation inconsistencies and enhanced performance). The API definition 16 may also include encoded type information 16b such as, for example, parameter type information (e.g., describing the data types that are accepted for requests during execution), return type information (e.g., describing the data types that are returned in response), and so forth. Automatically determining and incorporating the encoded type information 16b into the API definition 16 without reliance on source code annotations may further enhance the API definition 16 in terms of cost and/or performance.

Moreover, the API definition 16 may be considered complete and fully deployable during reimplementation of the API 10. The API definition 16 may be automatically generated by a router 15 within the API 10 or other technological component.

For example,

A web request against a specific server might include the following example:

GET /users

Where the first portion: "GET" is an HTTP (Hypertext Transfer Protocol) verb, and the second portion: "/users" is the path. The request may also include additional "body" data associated with it—in this case there is no body data as it is a GET request. By contrast, a "POST" request sends data and would be expected to have additional body data.

The router 15 may enable a web server to receive the web request and send (e.g., "route") it to the application code in the web server that will handle it. The routing may be done by users registering handler code against HTTP verbs and paths. For example, Router. get('/users', handler: myGetUsersHandler)

would register "myGetUsersHandler" to be called for GET requests made to the '/users' path.

Thus, the '/users' path might be one of the route paths in the dynamic path information 16a that the router 15 automatically adds to the API definition 16. As will be discussed in greater detail, the router 15 may also invoke a custom encoder to automatically generate type definitions and add them to the API definition 16 as the encoded type information 16b.

Figure 2:
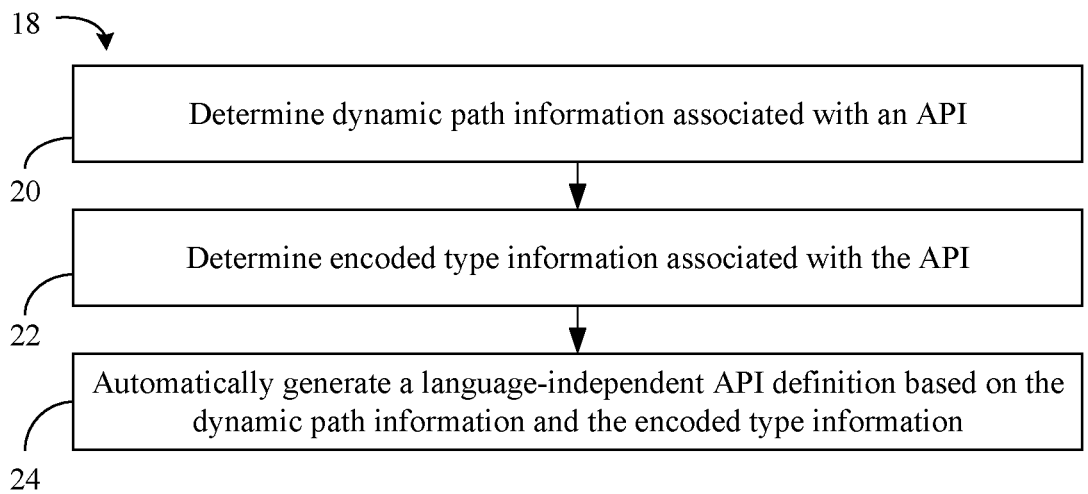
FIG. 2 is a flowchart of an example of a method of generating APIs according to an embodiment.

FIG. 2 shows a method 18 of generating APIs. The method 18 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 20 provides for determining dynamic path information associated with an API, wherein encoded type information associated with the API may be determined at block 22. Block 24 may automatically generate a language-independent API definition based on the dynamic path information and the encoded type information.

Block 20 may take into consideration the fact that dynamically defined paths (e.g., route paths registered by the API at runtime) may not be available to a source analyzer or compiler at build time. One example of such a situation may include REST (Representational State Transfer) API architectures. Moreover, obtaining the data type definitions for the request and the response may be challenging due to the request and response parameters being passed to the API code as encoded data rather than concrete types, which may be accessed/discoverable. For example, Table I below shows an example of registering an API call on "/users" that expects to receive a "User" type and returns a "User" type.

TABLE I

Example API Registration router.add("/users") { (user: User) -> User in return user
}

Figure 3:
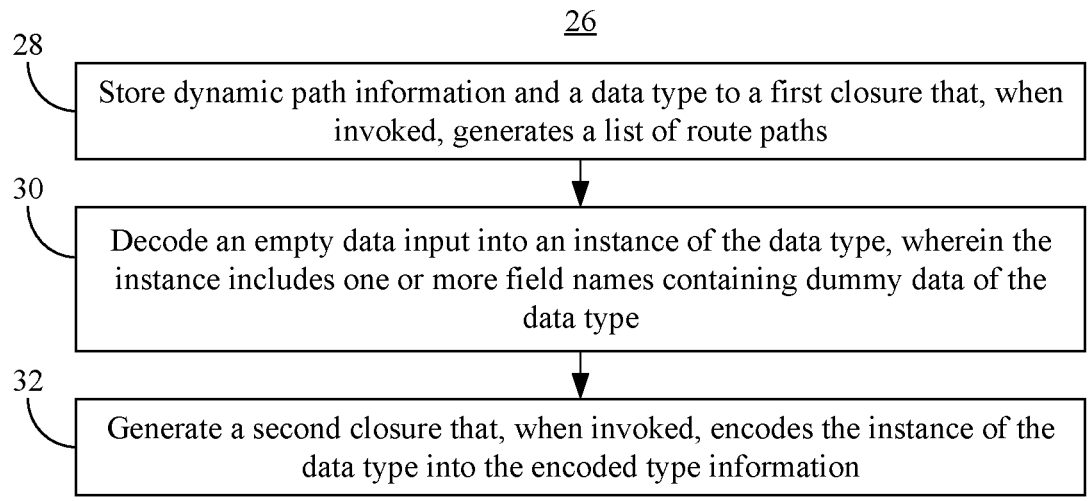
FIG. 3 is a flowchart of an example of a method of determining encoded type information associated with an API according to an embodiment.

FIG. 3 shows a method 26 of determining encoded type information associated with an API. The method 26, which may be implemented in fixed-functionality hardware, configurable logic, logic instructions, etc., or any combination thereof, may be readily substituted for block 22 (FIG. 22), already discussed. Illustrated processing block 28 provides for storing dynamic path information and a data type to a first closure (e.g., record storing a function together with an environment that associates each free variable of the function to the value or reference to which the name was bound when the closure was created). In the illustrated example, when executed, the first closure creates a list of route paths. Table II below shows a first closure example of a function to add a route path.

TABLE II

Example Route Path Addition func add<I: Codable, O: Codable>(_ route: String, codableHandler: @escaping CodableClosure<I, O>) {
let invoker: (Data) throws -> Data = { data in
let param = try JSONDecoder( ).decode(I.self, from: data)
let result = try codableHandler(param)
return try JSONEncoder( ).encode(result)
}
codableRoutes.append((route, invoker));
}

Although the example of Table II may avoid a loss of type information by storing the types in the closure rather than a router table (e.g., against a "route" path), the API router may not have access to the request and response types. Accordingly, the router may be provided with a way of generating the type definitions without having direct access to the types themselves. More particularly, block 30 may create an instance of a data type by decoding an empty data input into the instance of the data type, wherein the instance includes one or more field names containing dummy data of the data type. Additionally, illustrated block 32 generates a second closure that, when invoked, encodes the instance of the data type into the encoded type information. Thus, creating additional closures when routes are registered may enable the router to invoke the closures and obtain the type definitions. Moreover, a custom encoder may encode the type to a string (e.g., rather than a data format) that is a definition of the type. For example, Table II may be extended as shown in Table III to provide for the additional closure and the encoding.

TABLE III

Example Route Path Addition func add<I: Codable, O: Codable>(_ route: String,
codableHandler: @escaping CodableClosure<I, O>) {
let invoker: (Data) throws -> Data = { data in
let param = try JSONDecoder( ).decode(I.self, from: data)
let result = try codableHandler(param)
return try JSONEncoder( ).encode(result)
}
codableRoutes.append((route, invoker));
let typeDefinitions: ( ) -> (String, String) = {
let input = TypeEncoder( ).encode(TypeDecoder.decode(I.self, from: Data( ))
let outut = TypeEncoder( ).encode(TypeDecoder.decode(I.self, from: Data( ))
return (input, output)
}
apiDefinitions.append((route, typeDefinitions));
}

The method 26 may therefore provide a custom approach to encoding and decoding that results in two tables being stored in the router—one used to execute incoming web API requests, and a second table that may be iterated over in order to generate a full list of supported routes and type definitions.

The decode operation of block 30 may be included because encoders typically act on an instance of the type rather than the type definition and it may not be possible to have knowledge of what constructions are available for the type (or what data might be required to populate it).

Figure 4:
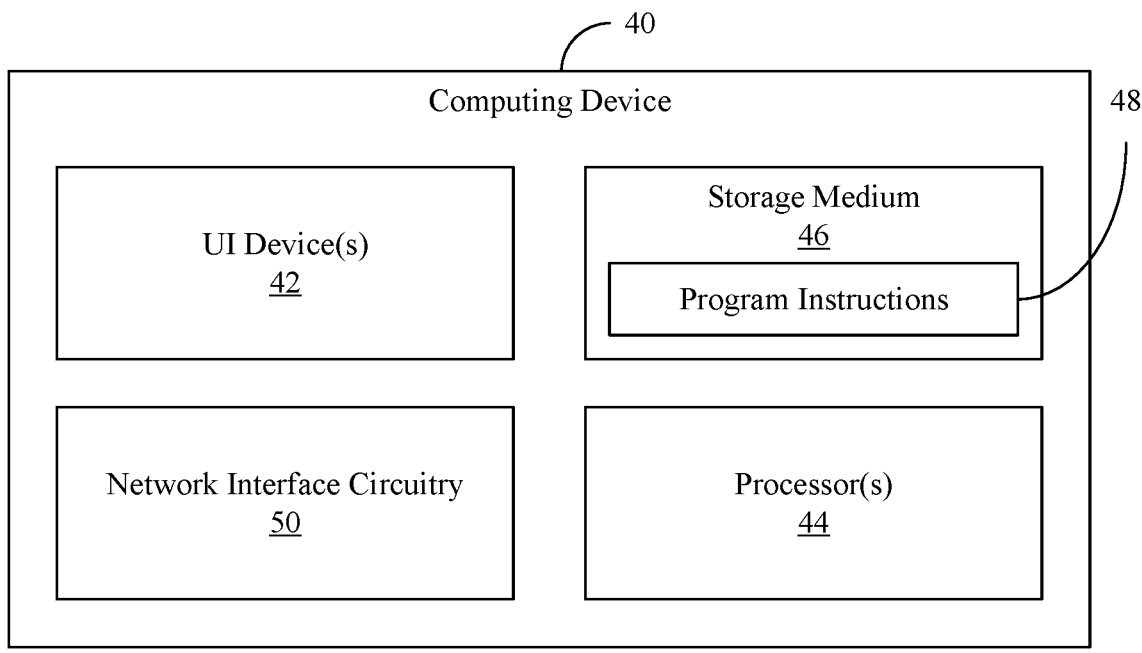
FIG. 4 is a block diagram of an example of a performance-enhanced computing device according to an embodiment.

FIG. 4 shows a computing device 40 that may be used to generate API definitions such as, for example, the language-independent API definition 16 (FIG. 1), already discussed. The illustrated computing device 40, which may be centralized (e.g., client device, server) or distributed (e.g., data center, cloud computing infrastructure), includes one or more user interface (UI) devices 42 (e.g., keyboard, mouse, touch pad, touch screen, monitor, microphone, speaker) to output a language-independent API definition associated with an API. The API, which may receive requests via network interface circuitry 50 (e.g., wired, wireless) might communicate with a microservice (e.g., GO, HASKELL), web application (e.g., JAVA, KITURA), and so forth. One or more processors 44 may be coupled to the UI device(s) 42 and a storage medium 46 (e.g., non-volatile memory, volatile memory, etc., or any combination thereof). The processor(s) 44 may generally execute the application and the API. In the illustrated example, the storage medium 46 includes program instructions 48 embodied therewith. The program instructions 48 may be executable by the processors 44 to cause the computing device 40 to perform one or more aspects of the method 18 (FIG. 2) and/or the method 26 (FIG. 3), already discussed. In one example, the program instructions 48 are implemented in a web API router.

Thus, execution of the program instructions 48 by the processor(s) 44 may cause the computing device 40 to determine dynamic path information and encoded type information associated with the API. The dynamic path information may include one or more route paths registered by the API at runtime. The encoded type information may include parameter type information, return type information, etc., or any combination thereof. Additionally, execution of the program instructions 48 may cause the computing device 40 to automatically generate the language-independent API definition based on the dynamic path information and the encoded type information. In one example, the language-independent API definition is generated without reliance on source code annotations. Therefore, the web API definitions generated by the computing device 40 may be complete and less costly to create, and the performance of the computing device 40 may be enhanced.

Execution of the program instructions 48 may cause the computing device 40 to store the dynamic path information and a data type to a first closure that, when invoked (e.g., by the router), generates a list of route paths. Moreover, execution of the program instructions 48 may cause the computing device 40 to generate a second closure that, when invoked (e.g., by the router) encodes an instance of the data type into the encoded type information. In one example, execution of the program instructions 48 causes the computing device 40 to create the instance of the data type. For example, an empty data input might be decoded into the instance of the data type, wherein the instance includes one or more field names containing dummy data of the data type. As already noted, the decode operation may be conducted because encoders typically act on an instance of the type rather than the type definition. Thus, it may not be otherwise possible to have knowledge of what constructions are available for the type or what data might be required to populate it.

Figure 5:
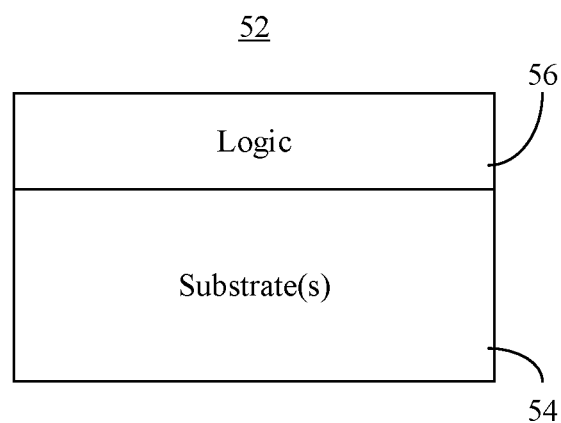
FIG. 5 is an illustration of an example of a semiconductor apparatus according to an embodiment.

Turning now to FIG. 5, a semiconductor package 52 (e.g., chip, die) that includes one or more substrates 54 (e.g., silicon, sapphire, gallium arsenide) and logic 56 (e.g., transistor array and other integrated circuit/IC components) coupled to the substrate(s) 54. The logic 56, which may be implemented at least partly in configurable logic and/or fixed-functionality hardware logic, may generally implement one or more aspects of the method 18 (FIG. 2) and/or the method 26 (FIG. 3), already discussed.

Thus, the logic 56 may automatically determine dynamic path information associated with an API, automatically determine encoded type information associated with the API, and automatically generate a language-independent API definition based on the dynamic path information and the encoded type information. Therefore, the web API definitions generated by the semiconductor package 52 may be complete and less costly to create, and the performance of the semiconductor package 52 may be enhanced.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computing device comprising:
   one or more user interface devices to output a language-independent application programming interface (API) definition associated with an API;
   one or more processors to execute the API; and
   a computer readable storage medium having program instructions embodied therewith, the program instructions executable by the one or more processors to cause the computing device to:
   automatically determine dynamic path information associated with the API without reliance on source code annotations associated with the API, wherein the dynamic path information is separate from any API description, wherein the dynamic path information is separate from any log files, wherein the path information is determined by creating an instance of a data type by decoding an empty data input into the instance of the data type, wherein the instance includes one or more field names containing dummy data of the data type, and wherein the dynamic path information includes one or more route paths registered by the API at runtime;

automatically determine encoded type information associated with the API without reliance on source code annotations associated with the API, and wherein the encoded type information is separate from any API description; and automatically generate the language-independent API definition based on the dynamic path information and the encoded type information.

2. The computing device of claim 1, wherein the program instructions are executable to cause the computing device to:

store the dynamic path information and a data type to a first closure that, when invoked, generates a list of route paths, wherein the storing includes storing a function together with an environment that associates each free variable of the function to a value or reference to which a name was previously bound when the first closure was created; and generate a second closure that, when invoked, encodes an instance of the data type into the encoded type information.

3. The computing device of claim 2, wherein the program instructions are executable to cause the computing device to create the instance of the data type.

4. The computing device of claim 1, wherein the dynamic path information is automatically added by a network router.

5. The computing device of claim 1, wherein the encoded type information includes parameter type information and return type information.

6. The computing device of claim 1, wherein the language-independent API definition is generated without reliance on source code annotations.

7. The computing device of claim 1, wherein the API is to communicate with an application selected from a group consisting of a microservice and a web application.

8. A computer program product to generate application programming interface (API) definitions, the computer program product comprising a computer readable storage medium having program instructions embodied therewith, the program instructions executable by a computing device to cause the computing device to:

automatically determine dynamic path information associated with an API without reliance on source code annotations associated with the API, and wherein the dynamic path information is separate from any API description, wherein the path information is determined by creating an instance of a data type by decoding an empty data input into the instance of the data type, wherein the instance includes one or more field names containing dummy data of the data type, wherein the dynamic path information includes one or more route paths registered by the API at runtime;

automatically determine encoded type information associated with the API without reliance on source code annotations associated with the API, and wherein the encoded type information is separate from any API description; and automatically generate a language-independent API definition based on the dynamic path information and the encoded type information.

9. The computer program product of claim 8, wherein the program instructions are executable to cause the computing device to:

store the dynamic path information and a data type to a first closure that, when invoked, generates a list of route paths; and generate a second closure that, when invoked, encodes an instance of the data type into the encoded type information.

10. The computer program product of claim 9, wherein the program instructions are executable to cause the computing device to create the instance of the data type.

11. The computer program product of claim 8, wherein the encoded type information includes parameter type information and return type information.

12. The computer program product of claim 8, wherein the language-independent API definition is generated without reliance on source code annotations.

13. The computer program product of claim 8, wherein the API is to communicate with an application selected from a group consisting of a microservice and a web application.

14. A method comprising:

automatically determining dynamic path information associated with an application programming interface (API) without reliance on source code annotations associated with the API, wherein the dynamic path information is separate from any API description, wherein the dynamic path information is separate from any log files, wherein the path information is determined by creating an instance of a data type by decoding an empty data input into the instance of the data type, wherein the instance includes one or more field names containing dummy data of the data type, and wherein the dynamic path information includes one or more route paths registered by the API at runtime;

automatically determining encoded type information associated with the API without reliance on source code annotations associated with the API, and wherein the encoded type information is separate from any API description; and automatically generating a language-independent API definition based on the dynamic path information and the encoded type information.

15. The method of claim 14, wherein determining the encoded type information includes:

storing the dynamic path information and a data type to a first closure that, when invoked, generates a list of route paths; and generating a second closure that, when invoked, encodes an instance of the data type into the encoded type information.

16. The method of claim 15, further including creating the instance of the data type.

17. The method of claim 14, wherein the encoded type information includes parameter type information and return type information.

18. The method of claim 14, wherein the dynamic path information includes one or more verbs registered by the API at runtime, wherein the dynamic path information includes at least one body registered by the API at runtime.

* * * * *